O. C. CARR.
ELECTRIC LOW LEVEL SIGNAL FOR GASOLENE TANKS.
APPLICATION FILED MAR. 19, 1910.
988,859.
Patented Apr. 4, 1911.
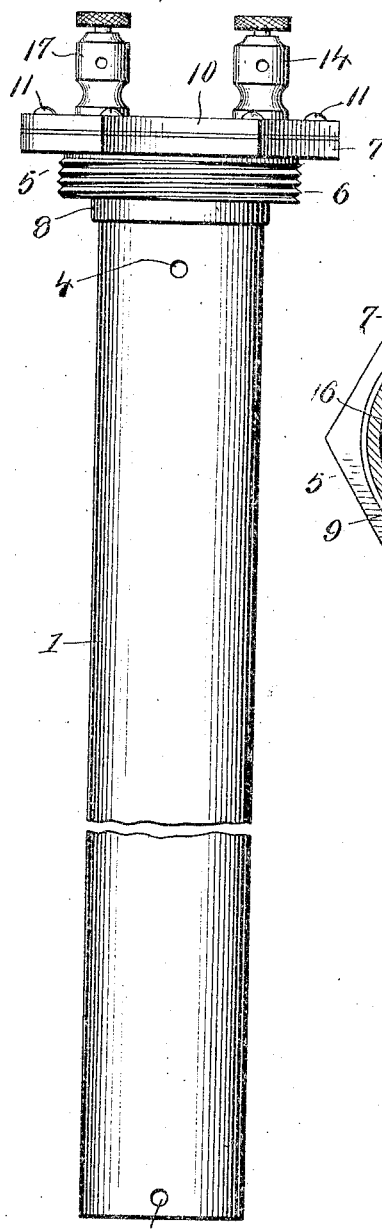
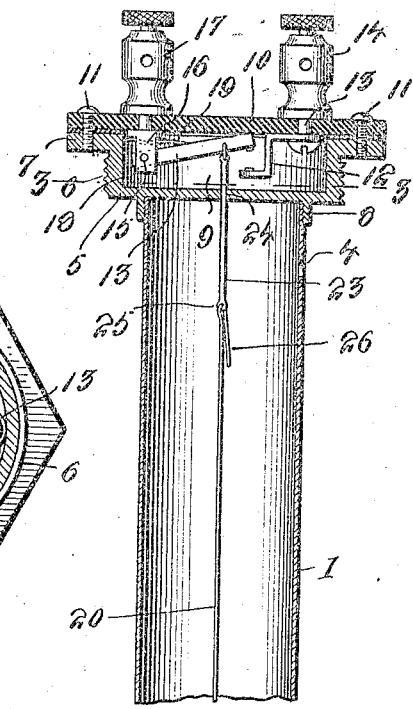
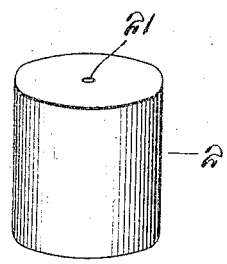
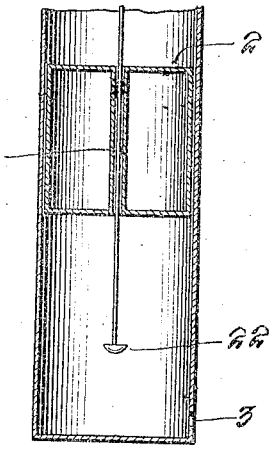
Inventor
Ora C. Carr
By Victor J. Evans
Attorney
Witnesses

UNITED STATES PATENT OFFICE.

ORA C. CARR, OF LANSING, MICHIGAN.

ELECTRIC LOW-LEVEL SIGNAL FOR GASOLENE-TANKS.

988,859.

Specification of Letters Patent.   Patented Apr. 4, 1911.

Application filed March 19, 1910.   Serial No. 550,399.

*To all whom it may concern:*

Be it known that I, ORA C. CARR, a citizen of the United States, residing at Lansing, in the county of Ingham and State of Michigan, have invented new and useful Improvements in Electric Low-Level Signals for Gasolene-Tanks, of which the following is a specification.

This invention relates to an alarm or signal device designed more especially for use in connection with gasolene tanks for automobiles, whereby the operator will be warned when the gasolene reaches a predetermined level so as to enable him to re-charge the tank at the most available place.

The invention has for one of its objects to provide an electric signal or indicating device including a circuit closer that is operated by a float so as to close a circuit which includes a valve or other signal for warning the operator.

Another object of the invention is the provision of an extremely simple, inexpensive and reliable level indicator which can be applied to any ordinary gasolene tank or the like and connected in a signal circuit.

With these objects in view, and others as will appear as the description proceeds, the invention comprises the various novel features of construction and arrangement of parts which will be more fully described hereinafter and set forth with particularity in the claims appended hereto.

In the accompanying drawing, which illustrates one embodiment of the invention; Figure 1 is a side view of the float actuated circuit closer adapted to be applied to a liquid-containing tank. Fig. 2 is a central vertical section thereof. Fig. 3 is a horizontal section on line 3—3, of Fig. 2. Fig. 4 is a perspective view of the float.

Similar reference characters are employed to designate corresponding parts throughout the several views.

The device comprises a tubular body 1, which is adapted to be placed vertically in the tank to which the level indicator is to be applied, and this tubular body constitutes a housing and guide for a float 2 freely movable vertically in the body, the latter having openings 3 and 4 to admit gasolene under the float and air above the same. On the upper end of the tube 1 is a cap 5 that is exteriorly threaded at 6 to screw into a threaded opening in the top of the tank and the tube is of such length as to extend close to the bottom of the latter. The cap has a hexagonal flange 7, whereby a wrench can be gripped to the cap in applying the device to or removing it from the tank. The tube 1 is removably connected with the cap by screwing into an annular flange 8 on the bottom of the cap. The cap is provided with a chamber 9 which is closed by a cover plate 10 of insulating material, and this plate is fastened to the cap by screws 11 extending through the cover and the flange 7.

In the chamber 9 is arranged a circuit closer consisting of a fixed contact 12 and a movable contact 13. The fixed contact is secured to the underside of the cover 10 by a screw 13 that serves to connect the binding post 14 securely on the cover. The lever is fulcrumed at 15 on a screw 16 that passes through the cover and secures the binding post 17 thereto. The head of the screw 16 is formed with spaced lugs 18 between which the lever extends and the pivot 15 passes through these lugs and lever to connect the latter with the screw. On the lever is fastened a leaf spring 19 that has its free end extending between the lugs 18 and slidably engaging the head of the screw 16, the springs being normally under a tension operating to hold the circuit closer open or the free end of the lever raised against the cover 10.

The circuit closer is adapted to be closed by the movement of the float and hence the latter is operatively connected with the swinging contact or lever 13. Extending longitudinally of the tubular casing 1 is a rod or wire 20 which passes freely through a central tube 21 in the float 2 and on the lower end of this wire is a stop 22 which the float strikes when the level in the tank lowers to a given point. The upper end of the wire 20 is connected by a link 23 with the movable contact 13 adjacent its free end, the link passing freely through an opening 24 in the bottom of the cap 5. The lower end of the link has an eye 25 through which the wire 20 passes and by bending the wire downwardly into a hook 26, the link and wire will be detachably connected. The wire can be readily lengthened or shortened by changing the point of bending and in this manner, the stop 22 can be raised or lowered and thus cause the circuit closer to complete the circuit when the level in the tank has lowered to a predetermined point.

In practice, the binding posts will be connected with a circuit including a battery or other source of current and a bell or other audible or visual signal device electrically operated. When the tank is full the float will be disposed at the upper end of the tubing 1 and the circuit closer will be open since the weight of the float is not brought to bear thereon. As the gasolene is consumed the float lowers and finally strikes the stop 22 on the pull wire 20, and as the level continues to lower, the swinging contact 13 will be engaged with the contact 12 so as to complete the signal circuit and thus warn the operator as to the contents of the gasolene tank.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. A device of the class described comprising a tubular casing, a chambered cap on the upper end thereof for attaching the device to a tank, a circuit closer arranged in the chamber of the cap and including relatively movable contacts, binding posts on the cap and connected to the contacts, a float in the casing, an element connected with the movable contact of the circuit closer and extending into the casing, and means on the element with which the float engages when the level reaches a predetermined point for closing the circuit closer.

2. A device of the class described comprising a hollow body, a float freely movable therein, a chambered cap on the upper end of the body, a cover plate of insulation closing the cap, a fixed contact in the cap, a binding post secured to the cover plate and electrically connected with the contact, a movable contact in the cap, a binding post secured to the cover plate and connected with the movable contact, a spring carried by the movable contact and operating to hold the same in open circuit position, an element connected with the movable contact and extending into the said body, and means on the element actuated by the float for engaging the movable contact with the fixed contact when the float lowers to a predetermined position.

3. A device of the class described, comprising a tubular casing, a float freely movable therein, a chambered cap on the upper end of the casing for securing the latter to a tank, a cover plate of insulation secured to the cap, a circuit closer supported by the cover plate and arranged in the chamber of the cap and including a movable element, means for actuating the element by the float, and binding posts on the cover plate for connecting the circuit closer in circuit with a signal, said circuit closer including a fixed contact with which the movable contact is adapted to engage, screws for securing the contacts to the cover plate and to the binding posts, a pivotal connection between the movable contact and one of the screws, and a spring carried by the movable contact and pressing against the screw for holding the movable contact normally in open circuit position.

In testimony whereof I affix my signature in presence of two witnesses.

ORA C. CARR.

Witnesses:
BENNETT S. JONES,
CHATTIN BRADWAY.